(12) United States Patent
Segev et al.

(10) Patent No.: US 11,934,693 B2
(45) Date of Patent: Mar. 19, 2024

(54) DETECTION OF SCATTERED DATA LOCATIONS

(71) Applicant: Western Digital Technologies, Inc., San Jose, CA (US)

(72) Inventors: Amir Segev, Meiter (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 279 days.

(21) Appl. No.: 17/185,789

(22) Filed: Feb. 25, 2021

(65) Prior Publication Data
US 2022/0229593 A1 Jul. 21, 2022

Related U.S. Application Data

(60) Provisional application No. 63/139,618, filed on Jan. 20, 2021.

(51) Int. Cl.
*G06F 3/06* (2006.01)
*G06F 12/06* (2006.01)
*G06F 13/28* (2006.01)

(52) U.S. Cl.
CPC .......... *G06F 3/0659* (2013.01); *G06F 3/0604* (2013.01); *G06F 3/0673* (2013.01); *G06F 12/0684* (2013.01); *G06F 13/28* (2013.01); *G06F 2212/1032* (2013.01)

(58) Field of Classification Search
CPC ........ G06F 3/06; G06F 3/0659; G06F 3/0604; G06F 12/00; G06F 13/00; G06F 12/0684; G06F 13/28
See application file for complete search history.

(56) References Cited

U.S. PATENT DOCUMENTS

| 5,483,624 | A | * | 1/1996 | Christopher | ........... G06K 1/121 358/1.6 |
| 10,275,378 | B2 | | 4/2019 | Benisty | |
| 10,282,132 | B2 | | 5/2019 | A et al. | |
| 10,452,278 | B2 | | 10/2019 | Benisty | |
| 10,466,906 | B2 | | 11/2019 | Benisty | |
| 10,564,872 | B2 | | 2/2020 | Benisty | |
| 2019/0287549 | A1 | * | 9/2019 | Poulsen | ................. G10L 21/055 |
| 2019/0361825 | A1 | * | 11/2019 | Chafin | ................. G06F 12/0868 |

* cited by examiner

*Primary Examiner* — Tuan V Thai (74) *Attorney, Agent, or Firm* — PATTERSON + SHERIDAN, LLP; Steven H. VerSteeg (57) ABSTRACT

The present disclosure generally relates to data storage devices, such as solid state drives (SSDs), specifically utilizing the data storage device memory in the execution of host commands. A controller is configured to receive a command pointer or a data chunk from a host device, mark a destination used for the command pointer or the data chunk, determine whether a last chunk of the command pointer or the data chunk has been received, and determine whether the command pointer or the data chunk uses an illegal combination of locations after determining that the last chunk of the command pointer has been received. The controller is further configured to return an error message to the host device upon determining that the command pointer or the data chunk uses an illegal combination of locations.

9 Claims, 9 Drawing Sheets

DETECTION OF SCATTERED DATA LOCATIONS

CROSS-REFERENCE TO RELATED APPLICATIONS

This application claims benefit of U.S. provisional patent application Ser. No. 63/139,618, filed Jan. 20, 2021, which is herein incorporated by reference.

BACKGROUND OF THE DISCLOSURE

Field of the Disclosure

Embodiments of the present disclosure generally relate to data storage devices, such as solid state drives (SSDs), specifically utilizing the data storage device memory in the execution of host commands.

Description of the Related Art

While working with Non-Volatile Memory Express (NVMe) protocol over peripheral component interconnect express (PCIe), the protocol allows a storage system to use memory located in a controller of a data storage device as if the memory were part of a host device memory, such as the host device dynamic random access memory (DRAM). The controller memory is further divided into two regions, a controller memory buffer (CMB) and a persistence memory region (PMR).

The NVMe standard 1.3d defines that for a specific command, the physical region page/scatter gather list (PRP/SGL) may be located either entirely in the CMB or entirely out of the CMB. Furthermore, the data associated with the specific command may be located entirely in the host memory or entirely in the CMB, but not mixed between both the host memory and the CMB. The NVMe standard 1.4 added the PMR, where the previous restrictions made for the NVMe standard 1.3d in regards to the CMB are implemented for the PMR as well. Thus, in the NVMe standard 1.4, data of any command may be located entirely inside the PMR or entirely out of the PMR. If data or data pointers are split between either the CMB and the PMR or the Host and the PMR, then the command will fail.

Thus, there is a need in the art to determine if data and data pointers reside either entirely in CMB, entirely in PMR, or in a mixture of at least two of the following: the CMB, the PMR, and the host device.

SUMMARY OF THE DISCLOSURE

The present disclosure generally relates to data storage devices, such as solid state drives (SSDs), specifically utilizing the data storage device memory in the execution of host commands. The host command comprises the command itself (i.e., an instruction to write or read data), pointers to data (e.g., a command pointer), and/or actual data (e.g., data chunks). A controller is configured to receive a command pointer or a data chunk from a host device, mark a destination used for the command pointer or the data chunk, determine whether a last chunk of the command pointers or the data chunk has been received, and determine whether the command pointers or the data chunks use an illegal combination of locations after determining that the last chunk of the command pointer or last data chunk has been received. The controller is further configured to return an error message to the host device upon determining that the command pointers or the data chunks use an illegal combination of locations.

In one embodiment, a data storage device includes a memory device and a controller coupled to the memory device. The controller is configured to receive command pointers from a host device, mark a destination used for the command pointers, determine whether a last chunk of the command pointers has been received, and determine whether the command pointers uses an illegal combination of locations after determining that the last chunk of the command pointers has been received.

In another embodiment, a data storage device includes a memory device and a controller coupled to the memory device. The controller is configured to receive data chunks associated with a command pointer from a host device, mark a data destination used for the data chunks, determine whether a last chunk of the data chunks has been received, and determine whether the data chunks uses an illegal combination of locations after determining that the last of the chunk of the data chunk has been received.

In another embodiment, a data storage device includes memory means, means to transfer data as instructed by a host device, and means to determine, after completing transferring of data as instructed by the host device, whether a mix of locations for the data or pointers is present.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), specifically utilizing the data storage device memory in the execution of host commands. A controller is configured to receive a command pointer or a data chunk from a host device, mark a destination used for the command pointer or the data chunk, determine whether a last chunk of the command pointer or the data chunk has been received, and determine whether the command pointer or the data chunk uses an illegal combination of locations after determining that the last chunk of the command pointer has been received. The controller is further configured to return an error message to the host device upon determining that the command pointer or the data chunk uses an illegal combination of locations.

Figure 1:
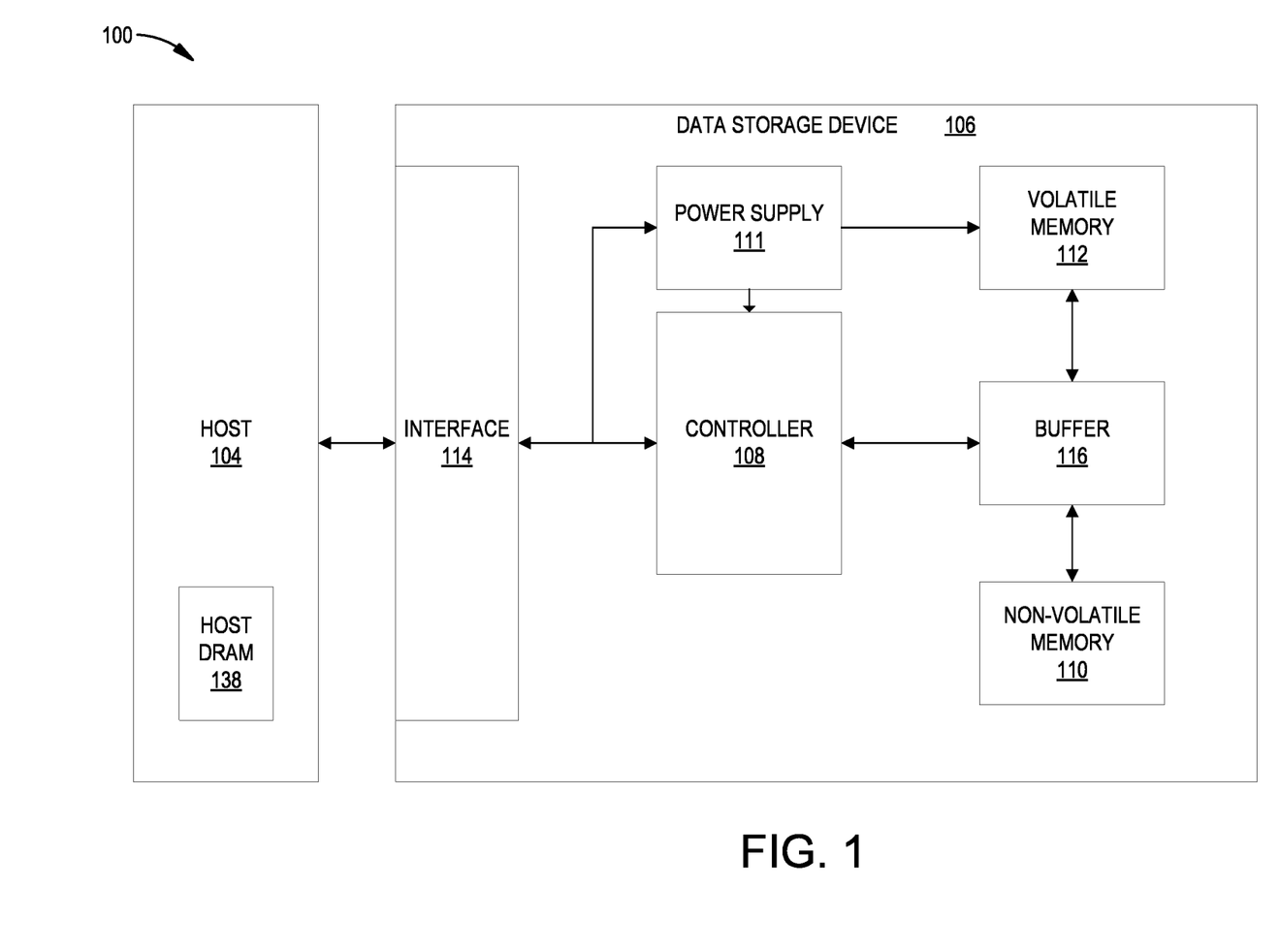
FIG. 1 is a schematic block diagram illustrating a storage system in which data storage device may function as a storage device for a host device, according to certain embodiments.

FIG. 1 is a schematic block diagram illustrating a storage system 100 in which data storage device 106 may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Furthermore, a portion of the volatile memory 112 may be appropriated to be used by the host device 104. For example, a controller memory buffer (CMB) may be a portion of the volatile memory 112 stored in or coupled to the controller 108. In another example, a persistent memory region (PMR) may be a portion of the volatile memory 112 of the data storage device 106. The CMB and the PMR may span across both SRAM and DRAM or be located in either SRAM or DRAM. Furthermore, in other examples, the CMB and the PMR may be in separate locations of the volatile memory 112. In other examples, the data storage device 106 may include either the CMB, the PMR, both the CMB and the PMR, or neither the CMB nor the PMR.

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory, such as the volatile memory 112, or the write buffer 116 before sending the data to the NVM 110.

Figure 2:
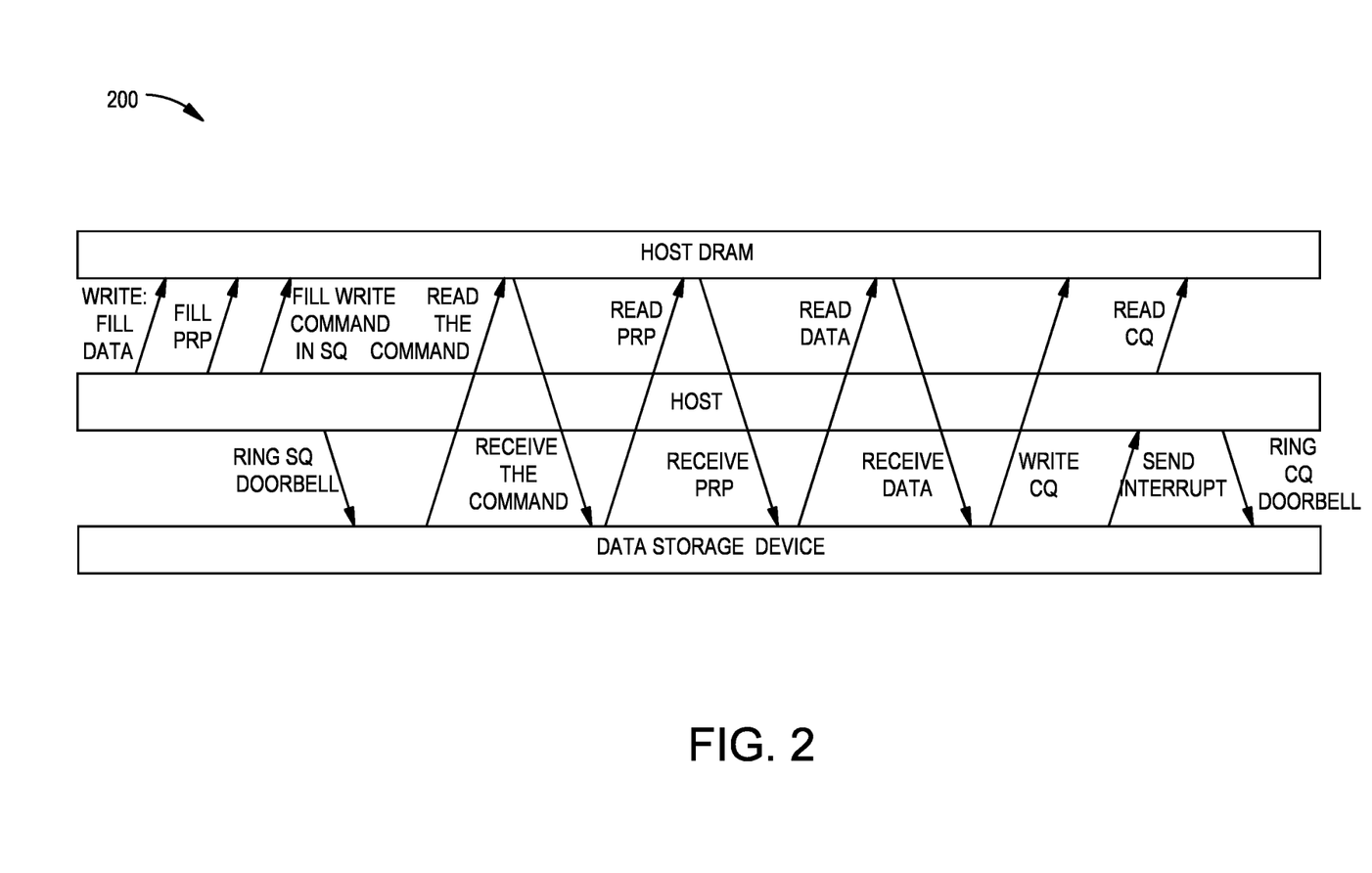
FIG. 2 is a schematic illustration of a write command flow, according to certain embodiments.

FIG. 2 is a schematic illustration of a write command flow 200, according to certain embodiments. A host device, such as the host device 104 of FIG. 1, includes a host DRAM, such as the host DRAM 138 of FIG. 1. The host device 104 communicates with a data storage device, such as the data storage device 106 of FIG. 1, by the way of a data bus. Though the write command flow 200 describes the data flow of a write command between the host device 104 and the data storage device 106, the command flow may describe the data flow of a read command between the host device 104 and the data storage device 106.

The host device 104 issues a write command to write data with the associated physical region page (PRP) or scatter gather lists (SGLs) to the host DRAM. The host device 104 also places the write command in the submission queue (SQ). It is to be understood that the terms PRPs and SGLs may be used interchangeably. It is also to be understood that for purposes of this disclosure the terms PRPs and SGLs are intended to include alternatively such as would be utilized in NVMe.

The host device 104 issues a SQ doorbell to the data storage device 106. The data storage device 106 responds and reads the command written to the host DRAM 138. The data storage device 106 receives the write command and reads the relevant PRPs from the host DRAM 138. The relevant PRPs from the host DRAM 138 are received by the data storage device 106. The data storage device 106 then reads and receives the data associated with the write command from the host DRAM 138. After receiving the data from the host DRAM 138, the data storage device 106 issues a completion notification to the completion queue (CQ) of the host DRAM 138.

The data storage device 106 also sends an interrupt to the host device 104 as an indication that a completion notification has been posted to the host DRAM 138. The host device 104 then reads and analyzes the relevant completion notification from the host DRAM 138 and issues a CQ doorbell to the data storage device 106, indicating that the completion notification has been read. The total number of transactions between the host device 104 and the data storage device 106 may be about 10 and the total number of transactions between the host DRAM 138 and the host device 104 may be about 11.

Figure 3:
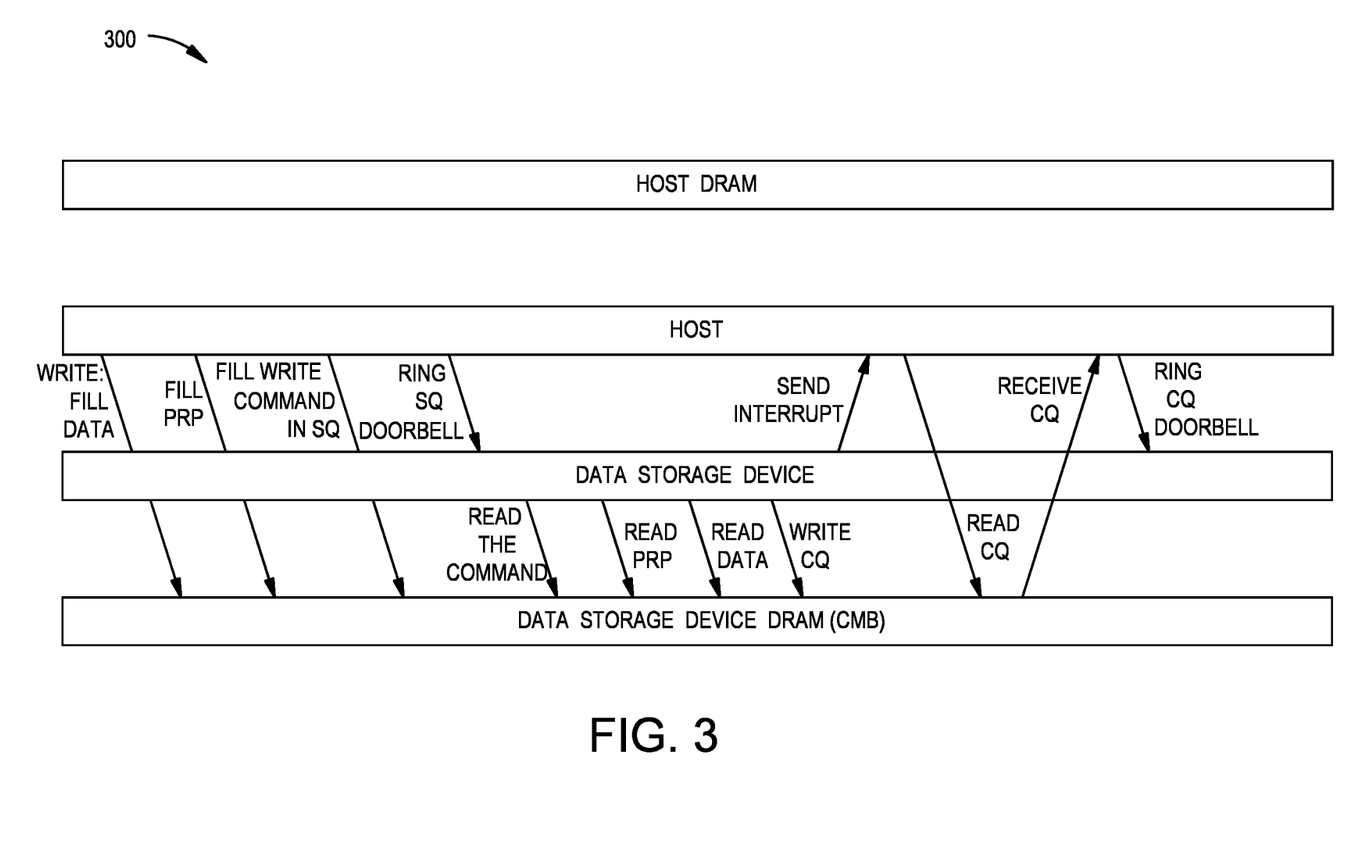
FIG. 3 is a schematic illustration of a write command flow with a controller memory buffer, according to certain embodiments.

FIG. 3 is a schematic illustration of a write command flow 300 with a controller memory buffer (CMB), according to certain embodiments. Though the write command flow 300 with the CMB describes the data flow of a write command between a host device, such as the host device 104 of FIG. 1, and a data storage device, such as the data storage device 106 of FIG. 1, the command flow may describe the data flow of a read command between the host device 104 and the data storage device 106. Furthermore, in some embodiments, it is contemplated that the write command flow 300 or the similarly contemplated read command flow may be utilized with the persistent memory region (PMR) or with both the PMR and the CMB.

The host device 104 issues a write command to write data with the associated PRPs. Rather than writing to a host DRAM, such as the host DRAM 138 of FIG. 1, the data storage device 106 includes a CMB functionality to provide access for the host device 104 a portion of the DRAM of the data storage device 106. In certain embodiments, the CMB may be included in the controller, such as the controller 108 of FIG. 1, of the data storage device 106. For example, in the write command flow 200 of FIG. 2, the write command is written to the host DRAM 138, where the data storage device 106 reads from the host DRAM 138. Referring to FIG. 3, rather than writing the command to the host DRAM 138, the write command is written to CMB.

In the write command flow 300 with the CMB, the host device 104 writes the write command and the relevant PRPs to the CMB of the data storage device 106. The host device 104 then fills the write command in the SQ. The host device 104 issues a SQ doorbell to the data storage device 106. The data storage device 106 then reads the write command with the associated PRPs and data from the CMB. The data storage device 106 writes a completion notification to the CQ of the CMB. An interrupt is sent to the host device 104. When the host device 104 receives the interrupt, the host device 104 reads and receives the completion notification from the CQ of the CMB.

The host device 104 then issues a CQ doorbell to the data storage device 106, indicating that the completion notification has been read. Because the data is written to the CMB of the data storage device 106, the number of transactions and the time associated with the transactions between the host device 104 and the data storage device 106 may be reduced, thus speeding the process of a read or write command. For example, the total number of transactions between the host device 104 and the data storage device 106 may be about 8 and the total number of transactions between the CMB and the data storage device 106 may be about 9. Thus, by using the CMB functionality of the data storage device 106, as described in FIG. 3, better performance and lower latency may be achieved due to less crosses between the host device 104 and the data storage device when compared to the write command flow 200 of FIG. 2.

Figure 4:
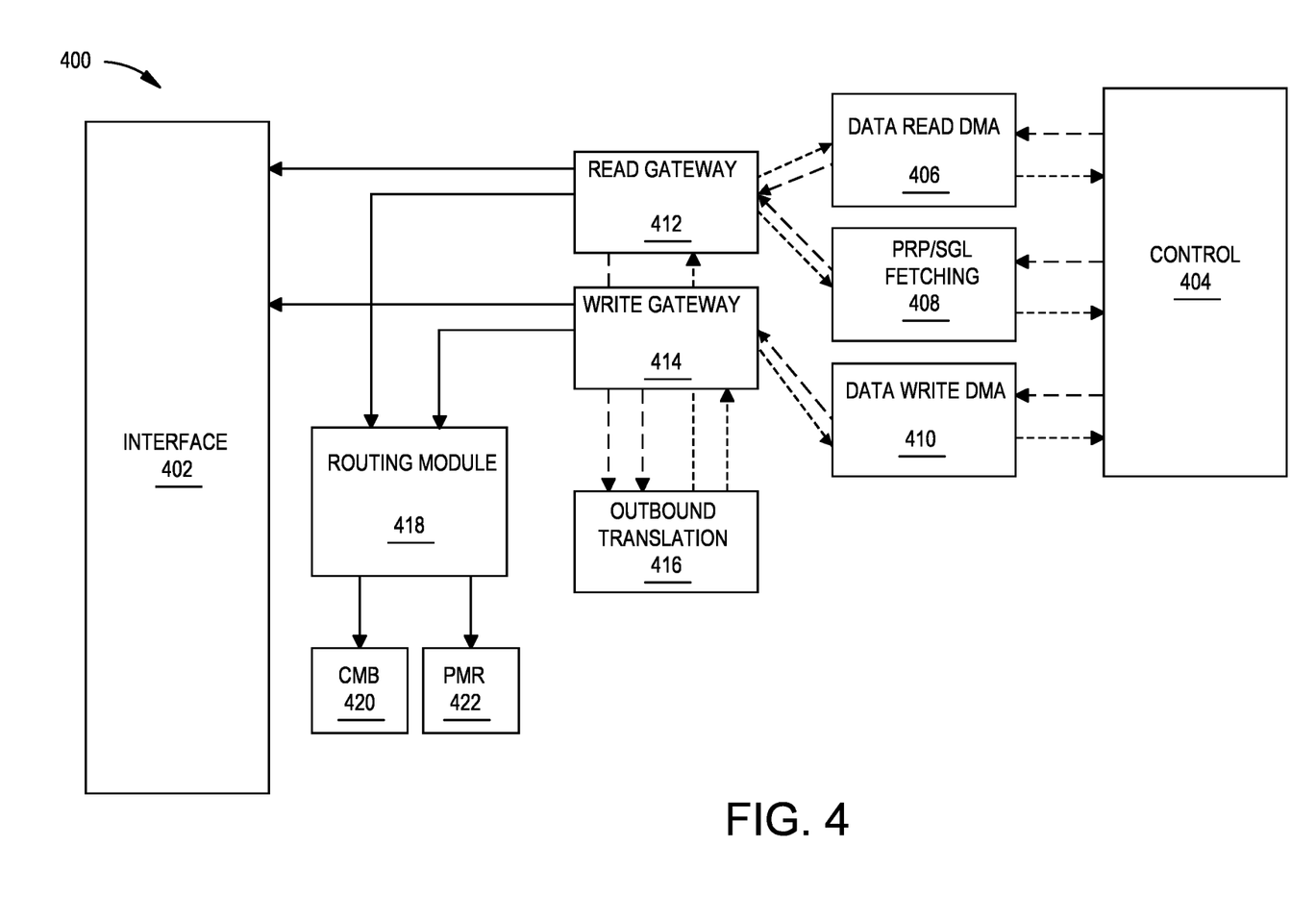
FIG. 4 is a schematic block diagram of a read/write command flow diagram, according to certain embodiments.

FIG. 4 is a schematic block diagram of a read/write command flow diagram 400, according to certain embodiments. The read/write command flow diagram 400 may be an implementation of executing read or write commands sent by a host, such as the host device 104 of FIG. 1, within a data storage device, such as the data storage device 106 of FIG. 1. The read/write command flow diagram 400 includes or utilizes different components of the data storage device 106. For example, the read/write command flow diagram 400 includes an interface 402 and a control 404. The interface 402 may be the interface 114 of FIG. 1 and the control 404 may be the controller 108 of FIG. 1. The dashed lines indicate a command flow, where the command flow includes a destination address. The dotted lines indicate a response flow, where the response flow includes an error.

In order for the controller 108 to determine that a PRP/SGL resides in either the CMB 420 or the PMR 422 and not on the host device memory, such as the host DRAM 138 of FIG. 1, the addresses of the pointers of the PRP/SGL should point to a memory range that belongs to either the CMB 420 or the PMR 422. Likewise, in order for the controller 108 to determine that data resides in the CMB 420 or the PMR 422, and not the host DRAM 138, the addresses in the PRP/SGL points to a memory range that belongs to either the CMB 420 or the PMR 422. The host device 104 provides the address range for the CMB 420 and the address range for the PMR 422 to the controller 108. The controller 108 reads the PRP/SGL in order to read or write data to a location in the NVM, such as the NVM 110 of FIG. 1.

When the control 404 receives a read or write command from the host device 104, the control 404 is responsible for gathering information on the success or failure of the read or write command. The control 404 interacts with a data read direct memory access (DMA) 406, a PRP/SGL fetching module 408, and a data write DMA 410. The data read DMA 406 is used to read data due to host write commands from the host device 104. The data write DMA 410 is used to write data due to host read commands from the host device 104. Because the PRP/SGL resides in either the CMB 420 or the PMR 422, the PRP/SGL fetching module 408 is utilized to read the PRP/SGL from the respective in the location in the CMB 420 or the PMR 422.

The read gateway 412 and the write gateway 414 each receives requests from the respective data read DMA 406, the PRP/SGL fetching module 408, and the data write DMA 410. The read gateway 412 and the write gateway 414 interacts with an outbound translation module 416 to determine the destination for the received request, where the destination is based on the address. The read gateway 412 and the write gateway 414 passes the request to the appropriate destination and, in return, receives responses. When the read gateway 412 and the write gateway 414 receives the responses, the responses are routed to the appropriate originating read flow or write flow (i.e., the data read DMA 406, the PRP/SGL fetching module 408, or the data write DMA 410).

The read gateway 412 and the write gateway 412 interacts with a routing module 418 to route the PRP/SGL and/or data to the appropriate location in either the CMB 420 or the PMR 422. The routing module 418 may be an internal routing matrix that directs transactions from the read gateway 412 and the write gateway 414 to the CMB 420 and the PMR 422. Furthermore, the read gateway 412 and the write gateway 414 interacts with the interface 402 to provide data to the host device 104.

Figure 5:
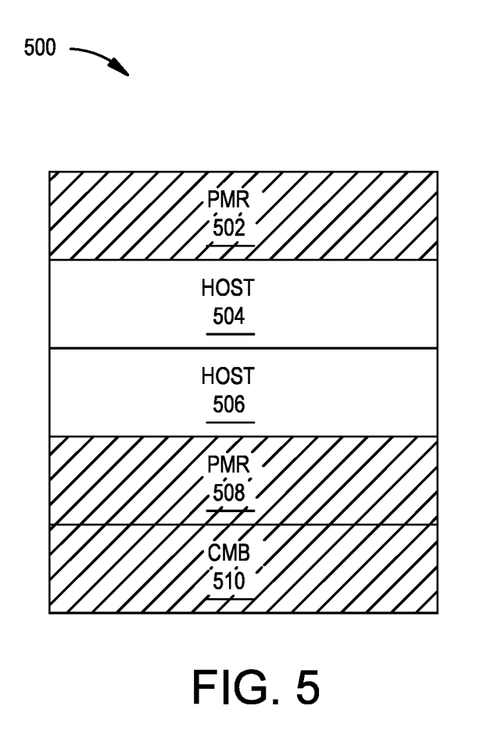
FIG. 5 is a schematic illustration of a data pointer (PRP/SGL) command structure, according to certain embodiments.

FIG. 5 is a schematic illustration of a data pointer (PRP/SGL) command structure 500, according to certain embodiments. The data pointer command structure 500 shows that the data is divided into five areas. The first area 502 and the fourth area 508 are located in the PMR, such as the PMR 422 of FIG. 4. The second area 504 and the third area 506 are located in the host device, such as the host device 104 of FIG. 1. The fifth area 510 is located in the CMB, such as the CMB 420 of FIG. 4. Because the data pointer command structure 500 is split between the PMR 422 and the CMB 420, an error is detected and reported to the host device 104 when the command associated with the data pointer command structure 500 is executed.

Figure 6A:
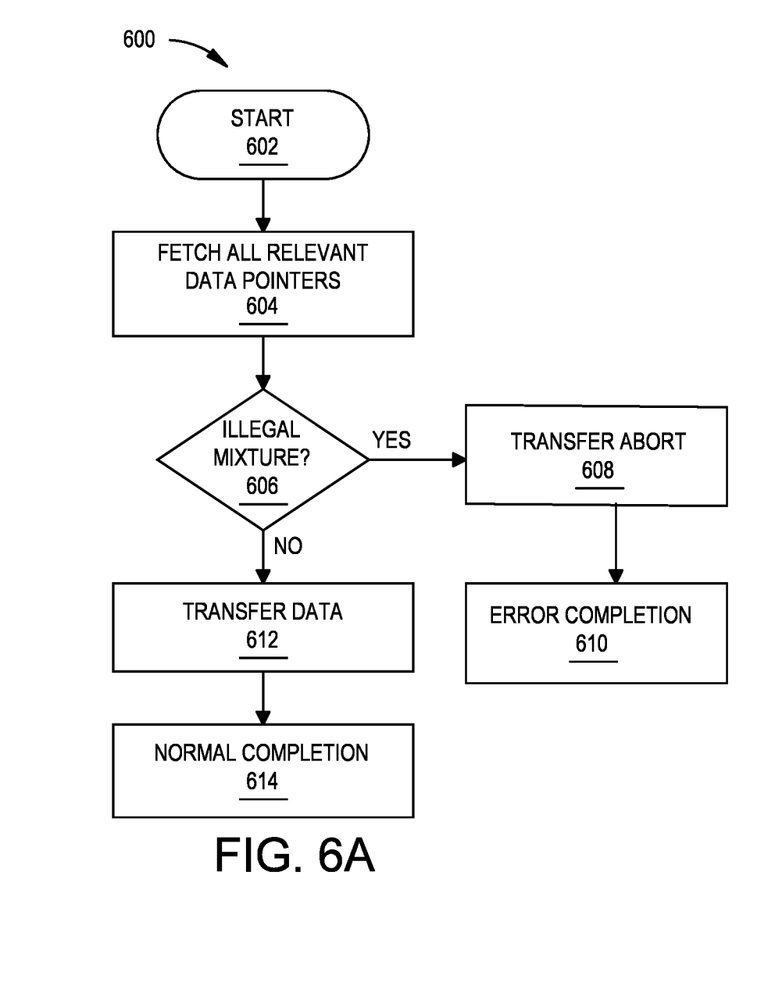
FIG. 6A is a schematic illustration of a method of a previous approach to an illegal mixture check, according to certain embodiments.

FIG. 6A is a schematic illustration of a method 600 of a previous approach to an illegal mixture check, according to certain embodiments. The method 600 begins at block 602 when the controller, such as the controller 108 of FIG. 1, receives a host request to read data or write data to the internal memory, such as the CMB 420 or the PMR 422 of FIG. 4. At block 604, all the relevant data pointers (i.e., PRP/SGL) are fetched from their relevant locations. After receiving the relevant data pointers at block 604, the controller, such as the controller 108 of FIG. 1, or the control, such as the control 404, determines whether received data pointers include an illegal mixture at block 606. An illegal mixture includes data pointers pointing to at least two of the following locations: the CMB 420, the host DRAM, such as the host DRAM 138 of FIG. 1, and the PMR 422.

If an illegal mixture is present at block 606, then the transfer is aborted at block 608 and an error completion message 610 is returned to the host device 104. However, if the illegal mixture is not present at block 606, such that the data pointers are located either entirely in the CMB 420, in the host DRAM 138, or in the PMR 422, then at block 612, the data is transferred to the respective location (i.e., the destination of the read or write command). At block 614, the method 600 is completed as normal.

Figure 6B:
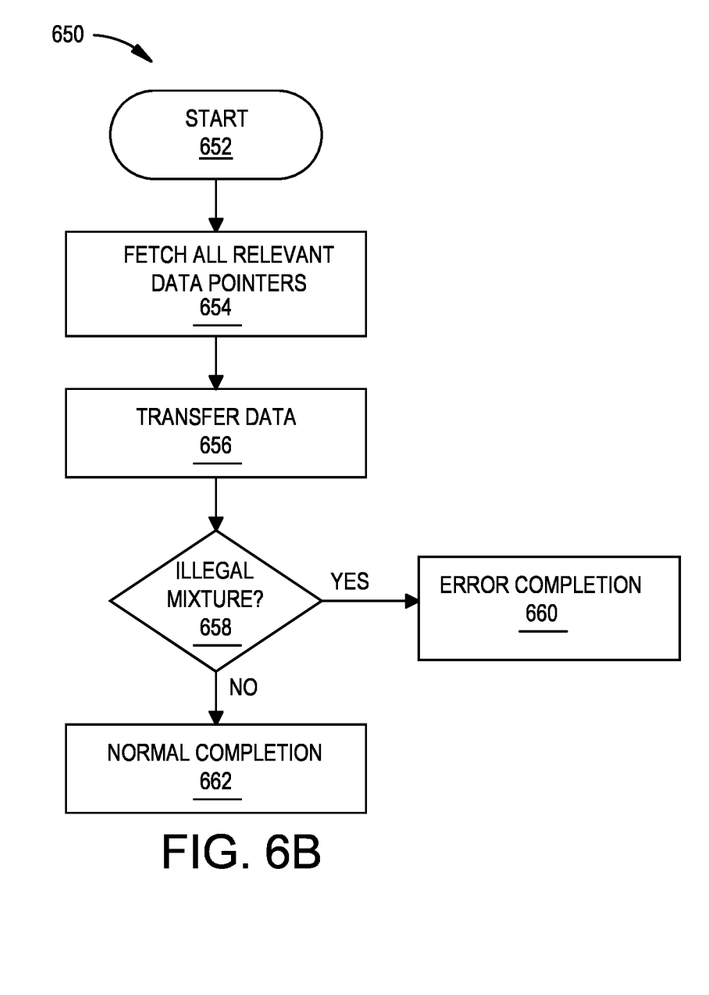
FIG. 6B is a schematic illustration of a method of an illegal mixture check, according to certain embodiments.

FIG. 6B is a schematic illustration of a method 650 of an illegal mixture check, according to certain embodiments. The method 650 begins at block 652 when the controller, such as the controller 108 of FIG. 1, receives a host request to read data or write data to the internal memory, such as the CMB 420 or the PMR 422 of FIG. 4. At block 654, all the relevant data pointers (i.e., PRP/SGL) are fetched from their relevant locations. After receiving the relevant data pointers at block 654, the relevant data is transferred to the respective location (i.e., destination of the read or write command) at block 656.

At block 658, the controller 108 or the control 404 determines if the data pointers includes an illegal mixture. If the data pointers includes the illegal mixture, then at block 660, an error completion message is returned to the host device 104. However, if the data pointers do not include the illegal mixture, then the method 650 is completed as normal at block 662. Unlike method 600, the decision or the determination if the data pointers includes an illegal mixture occurs after the data is transferred at block 656. By including the illegal mixture check after the data is transferred, previous command flows are not interrupted and the illegal mixture check may be implemented to the previous command flows.

It is contemplated that while methods 600 and 650 describe detecting an illegal mixture of data chunks, the methods 600 and 650 may be applicable to detecting an illegal mixture of data pointers.

Figure 7A:
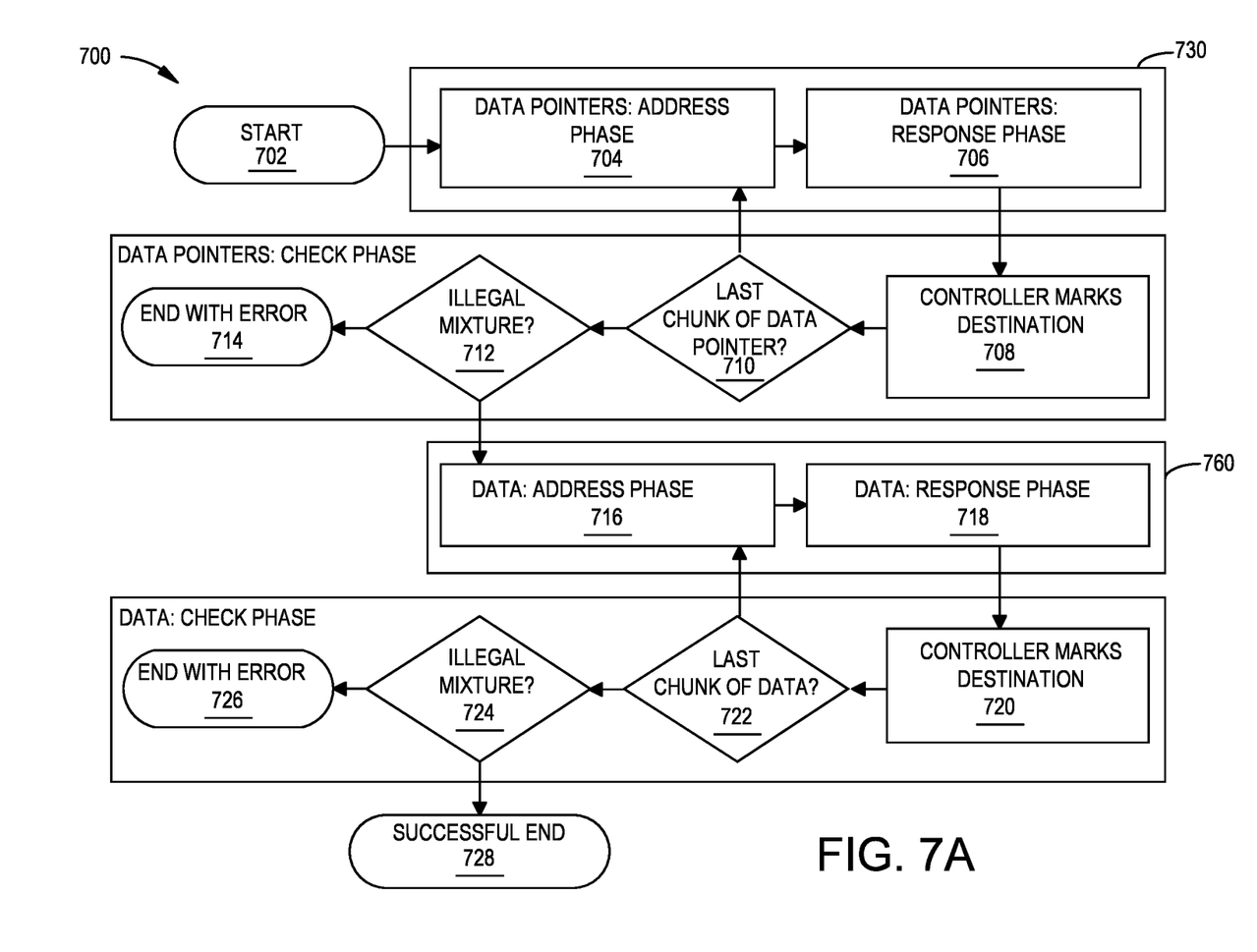
FIGS. 7A-7C are schematic illustrations of a method of detecting scattered data locations, according to certain embodiments.
Figure 7B:
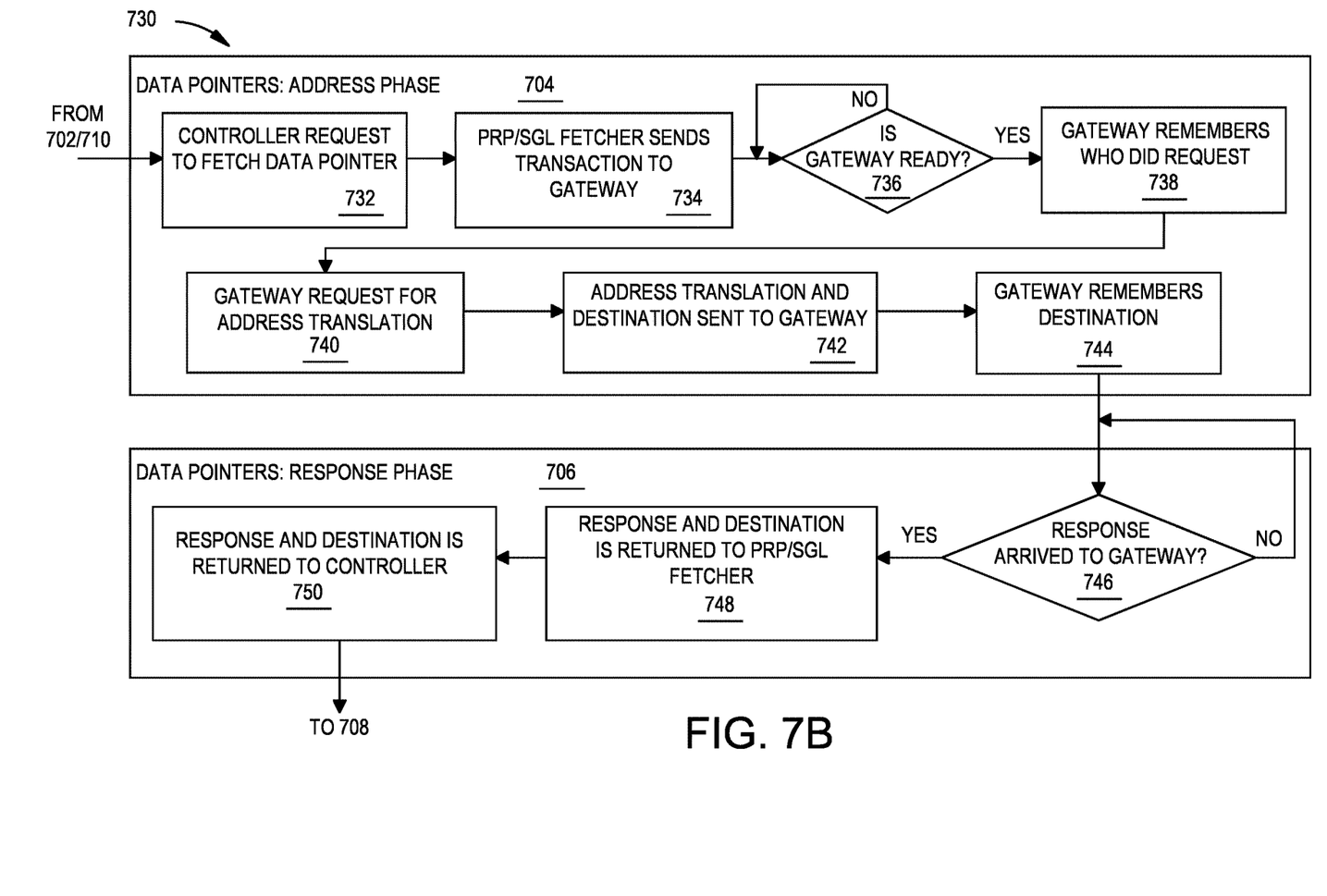
Figure 7C:
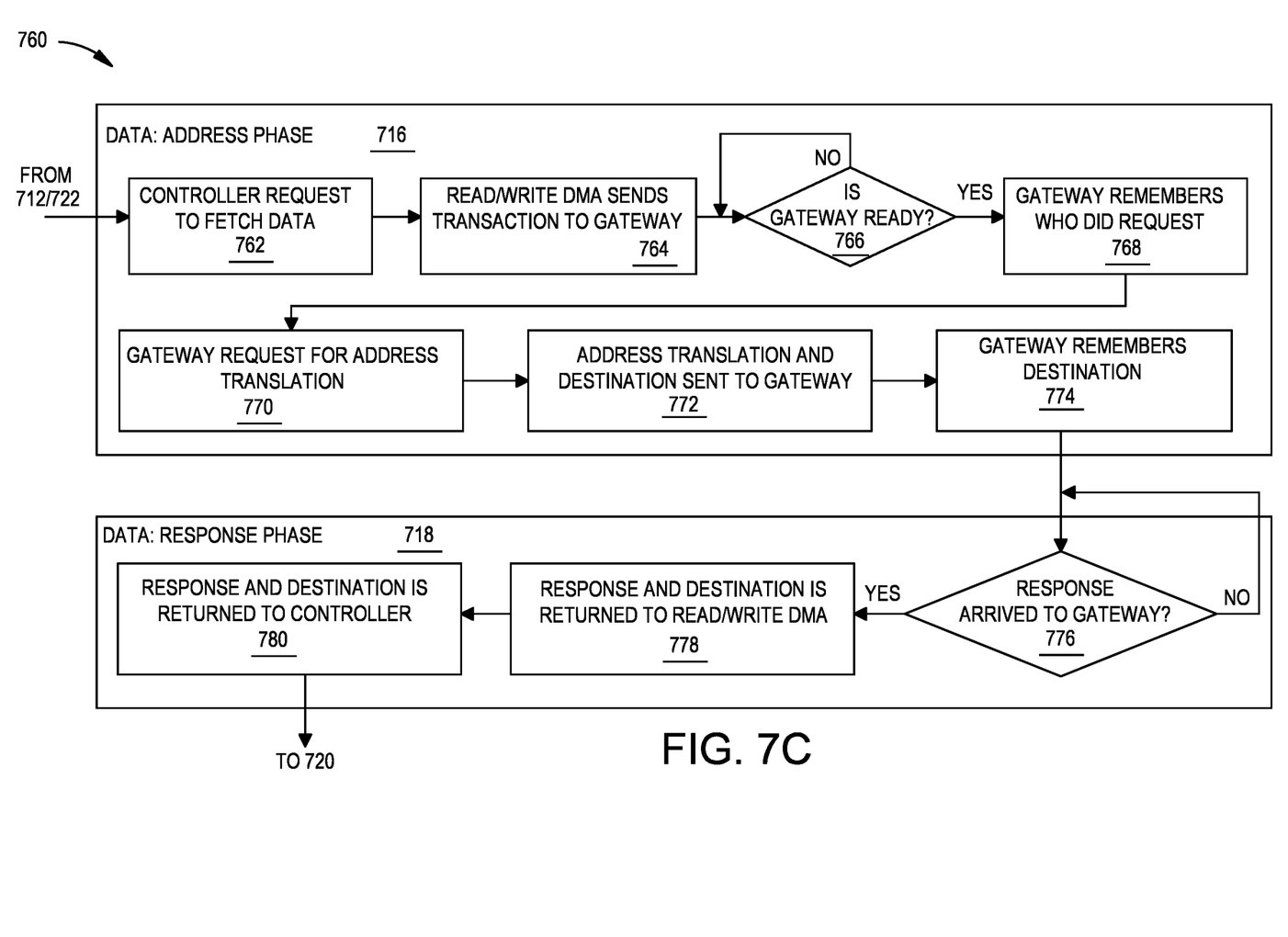

FIGS. 7A-7C are schematic illustrations of a method 700 of detecting scattered data locations, according to certain embodiments. Aspects of the method 700 may be similar to aspects of the method 650.

Referring to FIG. 7A, the method 700 includes a data pointers: address phase 704, a data pointers: response phase 706, a data pointers: check phase, a data: address phase 716, a data: response phase 718, and a data: check phase. The method 700 starts at block 702, where the data storage device, such as the data storage device 106 of FIG. 1, receives a read or write command from a host device, such as the host device 104 of FIG. 1. After receiving the read or write command from the host device 104, the method 700 advances to the data pointers: address phase 704 and subsequently, the data pointers: response phase 706. The data pointers: address phase 704 and the data pointers: response phase 706 will be described in greater detail in the description of FIG. 7B.

At the data pointers: check phase, the controller, such as the controller 108 of FIG. 1, marks the destination at block 708. The destination is the data pointer location of the received read or write command. In some examples, the data pointer may be referred to as command pointer. At block 710, the controller, determines if the received destination corresponds with the last chunk of the data pointers. If the last chunk of the data pointers has not been received, then the method 700 returns to the data pointers: address phase 704. However, if the last chunk of the data pointers has been received, then the controller 108 determines if the data pointers includes an illegal mixture (i.e., both CMB and PMR) at block 712. If the data pointers do include the illegal mixture at block 712, then at block 714 the method 700 ends with an error (i.e., returns an error message to the host device). However, if the data pointers do not include the illegal mixture at block 712, then the method 700 proceeds to the data: address phase 716 and subsequently to the data: response phase 718. The data pointers: address phase 716 and the data pointers: response phase 718 will be described in greater detail in the description of FIG. 7C.

At the data: check phase, the controller 108 marks the destination at block 720. The destination is the data location of the received read or write command. At block 722, the controller, determines if the received destination corresponds with the last chunk of the data. If the last chunk of the data has not been received, then the method 700 returns to the data: address phase 716. However, if the last chunk of the data has been received, then the controller 108 determines if the data includes an illegal mixture (i.e., both CMB and PMR) at block 724. If the data does include the illegal mixture at block 724, then at block 726 the method 700 ends with an error (i.e., returns an error message to the host device). However, if the data pointers do not include the illegal mixture at block 724, then the method 700 successfully ends at block 728 with a completion notification and interrupt message to the host device 104.

Regarding the data pointers: address phase 704 and the data: address phase 716, the phases begin at blocks 732 and 762. At blocks 732 and 762, the controller receives a request to fetch data pointers or data, respectively. At block 734, the PRP/SGL fetch, such as the PRP/SGL fetching module 408 of FIG. 4, sends the transaction to the data gateway or gateway, such as the appropriate read gateway 412 or write gateway 414 of FIG. 4. Likewise, at block 764, the relevant DMA, such as the read DMA 406 or the write DMA 410 of FIG. 4, sends the transaction to the relevant read gateway 412 or write gateway 414. At blocks 736 and 766, the controller determines if the gateway is ready. If the gateway is not ready, the method 700 loops at blocks 736 and 766 until the gateway is ready.

However, if the gateway is ready at block 736 and 766, the gateway remembers who did the request at blocks 738 and 768. At blocks 740 and 770, the gateway requests an address translation. At blocks 742 and 772, the address translation and destination are sent to the gateway. At blocks 744 and 774, the gateway remembers the destination. After remembering the destination at blocks 744 and 774, the method 770 proceeds to the data pointers: response phase 706 and the data: response phase 718.

At blocks 746 and 776, the controller determines if the response has arrived to the gateway. If the response has not arrived to the gateway, the method 700 loops at blocks 746 and 776 until the response arrives to the gateway. When the response arrives to the gateway in the data pointers: response phase 706, the response and destination are returned to the PRP/SGL fetcher at block 748. Likewise, when the response arrives to the gateway in the data: response phase 718, the response and destination are returned to the relevant read DMA 406 or the write DMA 410. At blocks 750 and 780, the response and destination are returned to the controller. At block 750, the method 700 continues to block 708 and at block 780, the method 700 continues to block 720.

In some examples, the method 700 may be used separately for data pointers or for data. For example, only the data pointer: check phase or the data: check phase is utilized. In another example, the data pointers may be held in one location, such as the CMB, and the data may be held in another location, such as the PMR.

By implementing an illegal mixture check at the completion of the read/write command flow, the detection of scattered data locations may be added efficiently to current read/write command flows.

In one embodiment, a data storage device includes a memory device and a controller coupled to the memory device. The controller is configured to receive command pointers from a host device, mark a destination used for the command pointers, determine whether a last chunk of the command pointers has been received, and determine whether the command pointers uses an illegal combination of locations after determining that the last chunk of the command pointers has been received.

The controller is configured to determine that the command pointers uses an illegal combination of locations and return an error message to the host device. The controller is configured to determine that the command pointers does not use an illegal combination of locations and start a data address phase operation for command data associated with the command pointers. The data address phase operation comprises reading data chunks or writing data chunks to the memory device. The controller is further configured to mark a data destination used for the data address phase operation, where the data destination is received from a data response phase operation, determine whether a last chunk of the command data has been received, and determine whether the command data uses the illegal combination of locations after determining that the last chunk of the command data has been received. The data response phase operation includes receiving a data response from a data gateway and returning the data response and data destination. The command pointer has a command structure comprising a plurality of areas, wherein each area of the plurality of areas is either a PMR area, a host device area, or a CMB area. The controller further includes a control unit, a data read DMA coupled to the control unit, a PRP/SGL fetching unit coupled to the control unit, and a data write DMA coupled to the control unit. The controller is further configured to determine that a response has arrived at a read or write gateway, return the response and destination to the PRP/SGL fetching unit, and return the response and destination to the control unit.

In another embodiment, a data storage device includes a memory device and a controller coupled to the memory device. The controller is configured to receive data chunks associated with a command pointer from a host device, mark a data destination used for the data chunks, determine whether a last chunk of the data chunks has been received, and determine whether the data chunks uses an illegal combination of locations after determining that the last chunk of the data chunks has been received.

The controller is further configured to read data or write data from the memory device after determining that the last chunk of the data chunk has not been received. The illegal combination of locations comprises a first location from a controller memory buffer, a persistent memory region, or a host location and a second location from a controller memory buffer, a persistent memory region, or a host location, and where the first location and the second location are different. The controller is further configured to mark the command as completed without an error upon determining that the data chunks does not use the illegal combination of locations. The controller is further configured to mark the command as completed with an error upon determining that the data chunks uses the illegal combination of locations. The marking the data destination used for the data chunk includes determining that a data response has arrived at a read or write gateway, returning the data response and data destination to a PRP/SGL fetching unit, and returning the data response and data destination to the controller. The read or write gateway comprises logic to remember an initiator of the data chunk. An address of the data chunk is translated and the data destination is transferred to the gateway, where the address includes one or more locations associated with the data chunk, and where the one or more locations includes at least one of a CMB, a PMR, or a host.

In another embodiment, a data storage device includes memory means, means to transfer data as instructed by a host device, and means to determine, after completing transferring of data as instructed by the host device, whether a mix of locations for the data is present.

The data storage device further includes a data read DMA, a PRP/SGL fetching unit, and a data write DMA. The means to determine whether a mix of location for the data is present includes means to determine whether data pointers for the data use an illegal combination of locations.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
  a memory device; and
  a controller coupled to the memory device, wherein the controller is configured to:
    receive a command pointer from a host device;
    mark a destination used for the command pointer;
    determine whether a last chunk of the command pointer has been received; and
    determine whether the command pointers uses an illegal combination of locations after determining that the last chunk of the command pointer has been received, wherein the illegal combination of locations comprises two or more of a persistent memory region (PMR) area, a host device area, and a controller memory buffer (CMB) area.

2. The data storage device of claim 1, wherein the controller is configured to determine that the command pointers uses the illegal combination of locations and return an error message to the host device.

3. The data storage device of claim 1, wherein the command pointer has a command structure comprising a plurality of areas, and wherein each area of the plurality of areas is either the PMR area, the host device area, or the CMB area.

4. The data storage device of claim 1, wherein the controller further comprises:
  a control unit;
  a data read direct memory access (DMA) coupled to the control unit;
  a physical region page (PRP)/scatter gather lists (SGL) fetching unit coupled to the control unit; and
  a data write DMA coupled to the control unit.

5. A data storage device, comprising:
  a memory device; and
  a controller coupled to the memory device, wherein the controller is configured to:
    receive a command pointer from a host device;
    mark a destination used for the command pointer;

determine whether a last chunk of the command pointer has been received;

determine whether the command pointers uses an illegal combination of locations after determining that the last chunk of the command pointer has been received;

determine that the command pointers does not use an illegal combination of locations; and start a data address phase operation for command data associated with the command pointers.

6. The data storage device of claim 5, wherein the data address phase operation comprises reading data chunks or writing data chunks to the memory device.

7. The data storage device of claim 5, wherein the controller is further configured to:

mark a data destination used for the data address phase operation, wherein the data destination is received from a data response phase operation;

determine whether a last chunk of the command data has been received; and determine whether the command data uses the illegal combination of locations after determining that the last chunk of the command data has been received.

8. The data storage device of claim 7, wherein the data response phase operation comprises:

receiving a data response from a data gateway; and returning the data response and data destination.

9. A data storage device, comprising:

a memory device; and a controller coupled to the memory device, wherein the controller comprises:

a control unit;

a data read direct memory access (DMA) coupled to the control unit;

a physical region page (PRP)/scatter gather lists (SGL) fetching unit coupled to the control unit; and a data write DMA coupled to the control unit; and wherein the controller is configured to:

receive a command pointer from a host device;

mark a destination used for the command pointer;

determine whether a last chunk of the command pointer has been received;

determine whether the command pointers uses an illegal combination of locations after determining that the last chunk of the command pointer has been received;

determine that a response has arrived at a read or write gateway;

return the response and destination to the PRP/SGL fetching unit; and return the response and destination to the control unit.

* * * * *